(12) United States Patent
Dell'Omo et al.

(10) Patent No.: US 12,553,766 B1
(45) Date of Patent: Feb. 17, 2026

(54) DYNAMIC SAMPLING WITH WIRELESS BATTERY-POWERED MONITOR

(71) Applicant: Tractian Technologies Inc, Atlanta, GA (US)

(72) Inventors: Canyon Grey Dell'Omo, Atlanta, GA (US); Marcos Hisashi Napoli Nishioka, Florianópolis (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/268,659

(22) Filed: Jul. 14, 2025

(51) Int. Cl.
*G01H 1/00* (2006.01)
*G01M 99/00* (2011.01)

(52) U.S. Cl.
CPC ............ *G01H 1/00* (2013.01); *G01M 99/005* (2013.01)

(58) Field of Classification Search
CPC .............................. G01H 1/00; G01M 99/005
USPC ........................................................... 702/35
See application file for complete search history.

(56) References Cited

U.S. PATENT DOCUMENTS

| 12,423,604 B1 * | 9/2025 | Voltani | ................... G06N 20/00 |
| 2023/0162484 A1 * | 5/2023 | Ryu | ..................... G06V 20/176 382/159 |

* cited by examiner

*Primary Examiner* — Aditya S Bhat
(74) *Attorney, Agent, or Firm* — Cognition IP, P.C.; Edward Steakley; Saleh Kaihani

(57) ABSTRACT

A maintenance monitoring and recommendation infrastructure can include a plurality of monitors, which can be attached to various industrial equipment. The monitors can include a plurality of sensors and wireless and/or wired communication circuitry to transmit the sensor data to a receiver. The receiver can be connected to the maintenance monitoring infrastructure, where the sensor data can be used to perform maintenance data analysis and provide artificial-intelligence-based maintenance recommendations. In some embodiments, the monitors can be battery-powered and can be configured with a baseline sampling profile. The AI models can identify a failure type from the baseline samples. The monitor can be instructed to dynamically change its sampling profile, based on the identified failure to collect samples more targeted to the identified failure.

20 Claims, 5 Drawing Sheets

DYNAMIC SAMPLING WITH WIRELESS BATTERY-POWERED MONITOR

BACKGROUND

Field

This invention relates generally to the field of maintenance monitoring devices and more particularly to battery-powered, portable maintenance devices with wireless communication capabilities.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial plants can include numerous mechanical machines with thousands of moving parts. To increase the efficiency of plant operations, the machines are monitored for maintenance purposes. Monitoring can include a trained technician visually inspecting the machines, observing the machine operations, and listening for any abnormal auditory cues that can indicate a present or potential maintenance-related fault in the machines. The technicians can also perform more sophisticated diagnosis, using traditional maintenance and diagnostic tools. Continuous monitoring of industrial machines can present operational inefficiencies and cost to an industrial plant, particularly as the number of machines can be substantial in an industrial plant. For these and similar reasons, plants or busy shops with mechanical machines can benefit from an automated maintenance infrastructure. The automatic maintenance infrastructure can continuously collect maintenance-related data from various machines, detect maintenance-related events, and recommend appropriate action.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1A:
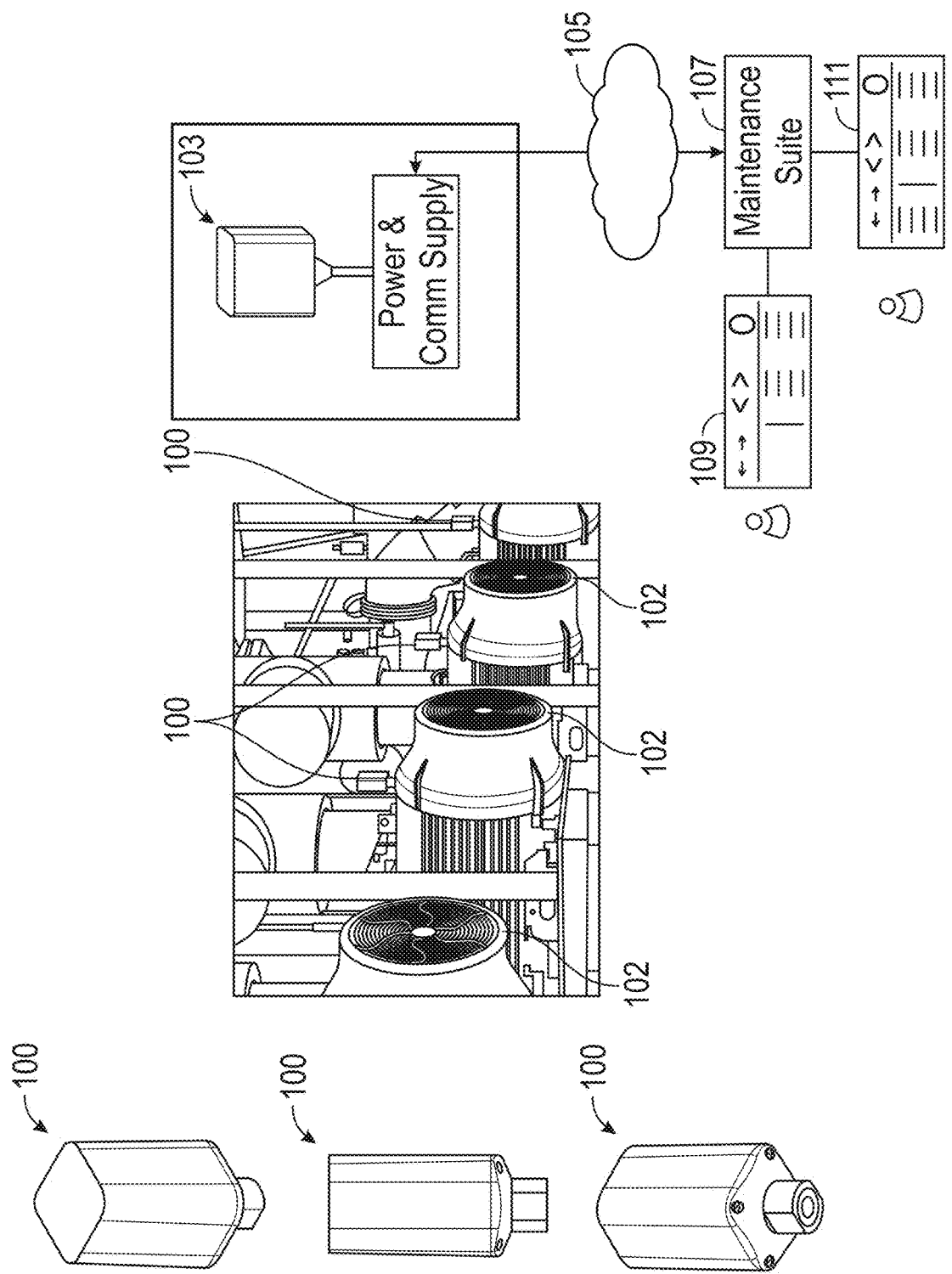
FIG. 1A illustrates example diagrams of a monitor, industrial machines, and an infrastructure of fault monitoring and maintenance operations according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Industrial machines can benefit from consistent and accurate fault monitoring with artificial intelligence processing of the monitored data. In some embodiments, a plurality of small monitor assemblies, each equipped with wireless communication circuitry can be attached to various industrial machines in a plant. The monitors can sense and report various operational parameters related to fault monitoring. For example, temperature and vibration can be monitored and reported. The quality of vibrations, vibration trend data and other characteristics can be indicators of fault occurring or developing in an industrial machine. Similarly, temperature and temperature trends of a machine can include indicators of occurring or upcoming faults in machines.

FIG. 1A illustrates example diagrams of a monitor 100, industrial machines 102, and an infrastructure of fault monitoring and maintenance operations according to some embodiments. The monitor 100 can be battery operated and can include a variety of sensing components enclosed in a housing. The monitor 100 can attach to machines 102 in the plant using a magnetic connection and/or by using other methods of attachment and fastening to secure the monitors 100 to machines 102 in the plant. The attachment of the monitors 100 to machines 102 can depend on the magnitude of the vibrations and other considerations related to the environment of the machines 102 and their plant. For example, if larger magnitude vibrations are expected, the connection between the monitors 100 and the machines 102 can be secured with an adhesive agent, so the monitors 100 can maintain their connections to the machines 102, despite large vibrations.

The monitors 100 can include wireless communication circuitry and can be in wireless communication with one or more receivers 103. In some embodiments, one or more monitors 100 can be modified to be in wired communication with a receiver 103 and have a connection to an outlet source of power. In other words, the source of power and type of communication of the monitors 100 can be modified, depending on the application and the environment of the plant to include any combination of battery-operated, outlet-operated, wired communication, and wireless communication. Similarly, the receivers 103 can include both wired and wireless communication circuitry. The receivers 103 can also be powered with or without the use of a battery. In some embodiments, both the monitors 100 and the receivers 103 can wirelessly communicate to a portable computer, such as a laptop, a smart phone, a smart tablet, or other portable devices, in the field, using a local or cellular wireless network.

The numbers and locations of the receivers 103 can depend on the size of the plant and then numbers and distances of the monitors 100, relative to the receiver 103 and the wireless communication technology used to communicate between the monitors 100 and the receiver 103. The receivers 103 can be mounted at various locations in a plant and can have connection to a power and a communication source. For example, the receivers 103 in a plant can be in wired and/or wireless communication to one or more communication portals 105. Example communication portals 105 can include a local network, the Internet, one or more cloud infrastructures, gateways, other receivers 105, and other communication midpoints, or endpoints. The receivers 103 can transmit the fault monitoring data for upstream processing. The receivers 103 can also receive various operational configuration files, settings files, and/or other operating parameters and can transmit the operating parameters to the monitors 100. Examples operating parameters can include various timing and frequency of when and how the monitors 100 should collect data from the machines 102.

A maintenance suit 107 can receive monitoring data from the monitors 100 and perform processing related to fault monitoring and maintenance operations on the data. The maintenance suite 107 can include a variety of submodules and databases that can support processing of the monitoring data, including, storage of the data, generating reports from the data, extracting trends from the data, generating fault prediction from the data, generating maintenance action items, tickets, generating alerts, and/or other automated actions related to the maintenance of the machines 102. In some embodiments, the operations of the maintenance suite 107 can include running artificial intelligence (AI) models that can assist in fault prediction, maintenance recommendation, pattern and trend detection, and other data analytics action, related to machine maintenance. Example artificial intelligence techniques and/or models used by maintenance suite 107 can include neural networks, deep neural networks, machine learning, convolutional neural networks (CNNs), random forests, and others.

The maintenance suite 107 can support a variety of user interfaces (UIs). For example, the maintenance suite 107 can support a frontend user interface 109 and a backend user interface 111. Various parameters related to the operation of the monitors 100 can be viewed and/or modified via the user interfaces 109, 111. The user interfaces 109, 111 can provide access for a user to generate or modify configuration files, settings and operating parameters for the monitors 100 and the maintenance suite 107. The users can also view the output of the maintenance suite 107, and/or raw or processed monitoring data, via the user interfaces 109, 111.

While not shown, the monitors 100 are not the only maintenance-related in-field components operated by the maintenance suite 107. Other components associated with monitoring and maintenance of the machines 102 and the plant can also be in communication with the maintenance suite 107. For example, in some embodiments, energy management components in communication with the maintenance suite 107, can monitor the power consumption of the machines 102 and their plant.

Depending on the size of an industrial plant, the monitors 100 can be numerous, for example in the hundreds or thousands. The maintenance suite 107 can streamline and track data from hundreds or thousands of machines and automate the identification and tracking of maintenance-related tasks for a large industrial plant, having hundreds or thousands of machines. Monitoring data from a large plurality of monitors 100 can also enable better training and failure pattern detection for the AI models of the maintenance suite 107.

Figure 1B:
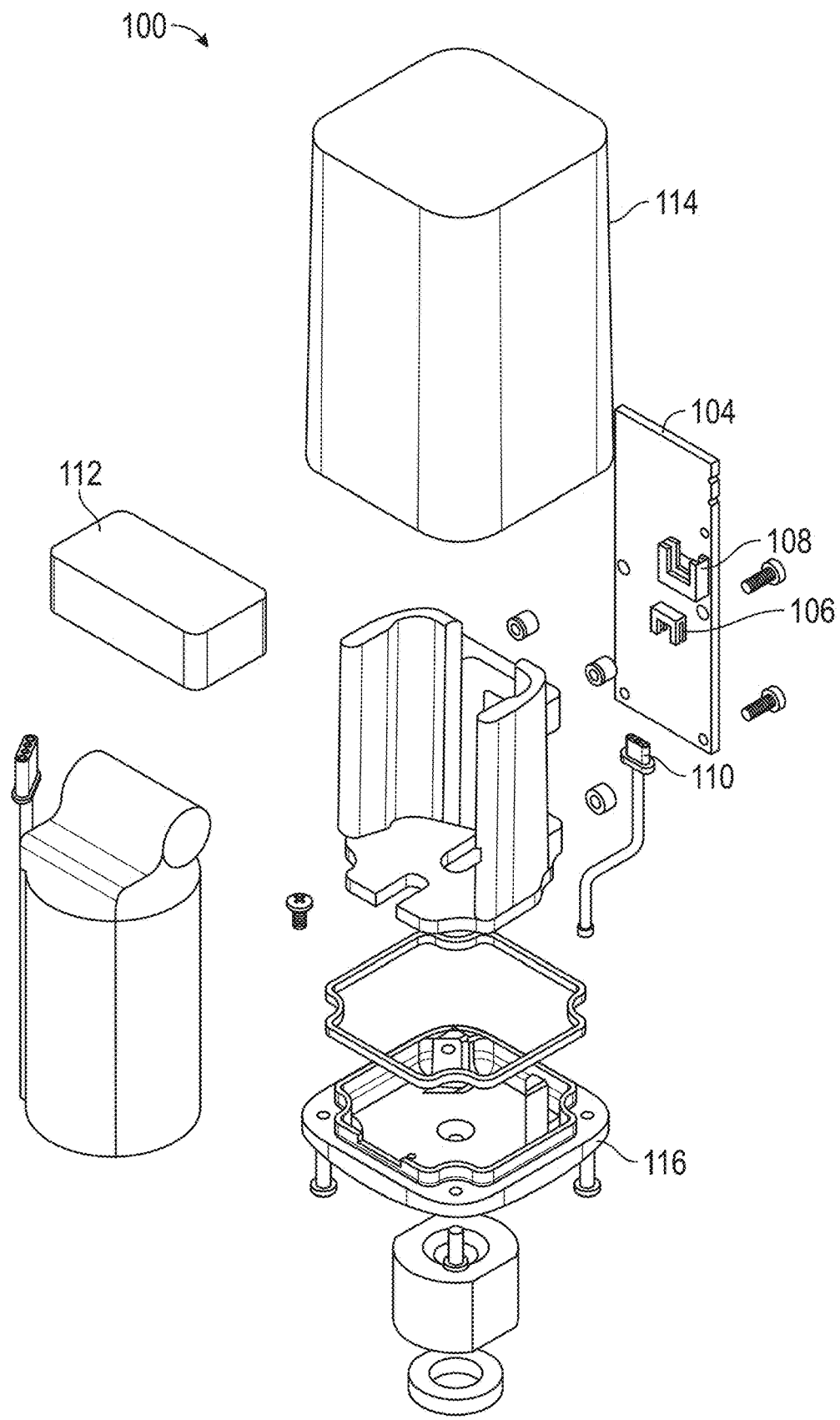
FIG. 1B illustrates an exploded view of the monitor of the embodiment of FIG. 1A.

FIG. 1B illustrates an exploded view of a monitor 100. Some example components include the printed circuit board (PCB) 104, the microcontroller 106, an accelerometer 108, a temperature sensor 110, a battery module 112, various spacers, holders, internal conduits, and a housing 114. The housing 114 can house the internal components of the monitor 100. A housing lid 116 can enclose the housing 114 and seal the internal components of the monitor 100 from the outside. The monitor 100 can be made water-, dust- and particle-resistant by a variety of techniques. For example, in some implementations, the monitor 100 can be resin-coated. The battery module 112 can include one or more lithium-ion batteries, and a battery management system (BMS). In other embodiments, the BMS can be external to the battery module 112, for example, it can be mounted on the PCB 104. In some embodiments, the life expectancy of the battery module 112 can be between three to five years.

The monitor 100 can include communication circuitry, corresponding to the communication circuitry of one or more receivers, for example, the receivers 103, and one or more local, private and/or public communication network, including one or more cellular networks. The choice of network and communication circuitry can depend on the size of the plant and the distance of the monitor 100 from a receiver 103. The communication circuitry of the monitor 100 can be mounted on the PCB 104. In some embodiments, the communication circuitry may be integrated in the microcontroller 106. Similarly, in other embodiments, various components can be combined into one or use a component that integrates several components together. The monitor 100 can include a magnetic collar to provide magnetic attachment between the monitor 100 and the machine 102.

In some embodiments, the temperature sensor 110 can be routed to a surface very near the point of contact between the monitor 100 and the machine 102 to provide a more accurate reading of the temperature of the machine 102.

The accelerometer 108 can be a micro-electro-mechanical system (MEMS) accelerometer, capable of one, two, or three axis acceleration data. For example, in some embodiments, the accelerometer 108 can measure forces in three directions along the XYZ axes. The accelerometer 108 can measure and transmit both magnitude and spectral data of the vibrations of a machine 102 to the microcontroller 106.

The microcontroller 106 can be a collection of various components, including computer or computing components. Example components of the microcontroller 106 can include a processor, such as a central processing unit (CPU), permanent and impermanent memory, including for example, random access memory (RAM) of various kinds, solid state, flash or other permanent memory, interconnects, buses and communication vias between the various components. In some embodiments, the microcontroller 106 can include external communication circuitry to enable wireless communication, including radio frequency identification (RFID), Bluetooth, cellular, or other communication technologies. In other embodiments the monitor 100 can include dedicated wireless communication circuitry, fabricated or included in the monitor 100, in a separate component than the microcontroller 106.

The monitors 100 can be configured to spend the majority of their time in hibernation state to conserve battery power. In hibernation mode, the power to all or some of the components of the monitor 100 can be reduced or minimized, thereby reducing the overall battery consumption in the hibernation state. The monitors 100 can be configured to periodically exit hibernation mode and enter normal operation mode, where power and functionality to some or all components is restored. For example, the monitors 100 can perform periodic sampling of various operational parameters of the machines 102, such as temperature and vibrations. When scheduled sampling is not performed, the monitors 100 can be in hibernation mode.

The monitors 100 can perform a variety of samplings of machine operation parameters. For example, for the vibration parameter of the machines 102, the monitors 100 can perform various samplings at different intervals and with different characteristics. Example sampling characteristics can include sampling intervals, sampling frequency, sampling rate, sampling range, sampling resolution and other characteristics. Sampling interval can refer to the period by which the monitor 100 turns ON and performs a sampling with a selected set of sampling characteristics. In some embodiments, the monitors 100 can be configured to perform scheduled sampling sessions, which are samplings performed at selected intervals. The selected intervals can depend on the type of machines 102 and other factors that are application-dependent, based on where the monitors 100 are used. Example sampling intervals can include sampling with intervals separated by minutes, hour or hours, days, or even months, and other intervals.

When the monitor 100 is implemented as a battery-powered device in wireless connection to the receiver 103, the operations of the monitor 100 can be configured to conserve battery. In a typical implementation, where a large plurality of the monitors 100 are in communication with a receiver 103, each monitor 100 may have to limit the volume of communication to the receiver 103. In other words, in a typical implementation in a plant, the monitors 100 can operate under battery power constraint and communication bandwidth constraint. Nevertheless, the monitors 100 can be configured to collect their samples in a manner that the maintenance suite 107 can have sufficient sample data to perform monitoring and diagnosis.

In some scenarios, machine faults can exhibit a corresponding vibration signal characteristic. Characteristics corresponding to different failures may present themselves in various segments of the frequency spectrum, generated from the vibration signal of a machine. For example, sample characteristics indicative of a rolling bearing failure tend to show up in higher frequencies and are more observable in those frequencies. By contrast, the unbalanced and/or out of alignment failure generate sample characteristics that tend to be in lower frequencies and are more observable in the lower frequency range of the frequency spectrum of a vibration signal. Traditional vibration analyzers can locally connect to a machine 102 and operate free of some of the operation constraints of a wireless, battery-operated monitor 100. For example, traditional vibration analyzers can obtain samples of any duration, resolution, and frequency ranges, while the monitor 100 limits some of its collection parameters, based on battery and communication bandwidth constraint. Nevertheless, the monitor 100 can be dynamically configured to apply a corresponding sampling profile to meet its power, and communication constraints, while collecting a robust, reliable and relevant portion of the frequency spectrum of a vibration signal. In some embodiments, a monitor 100 can use a baseline sampling profile for collecting machine sample data, and can dynamically modify its sampling profile, based on a detected failure.

Figure 2:
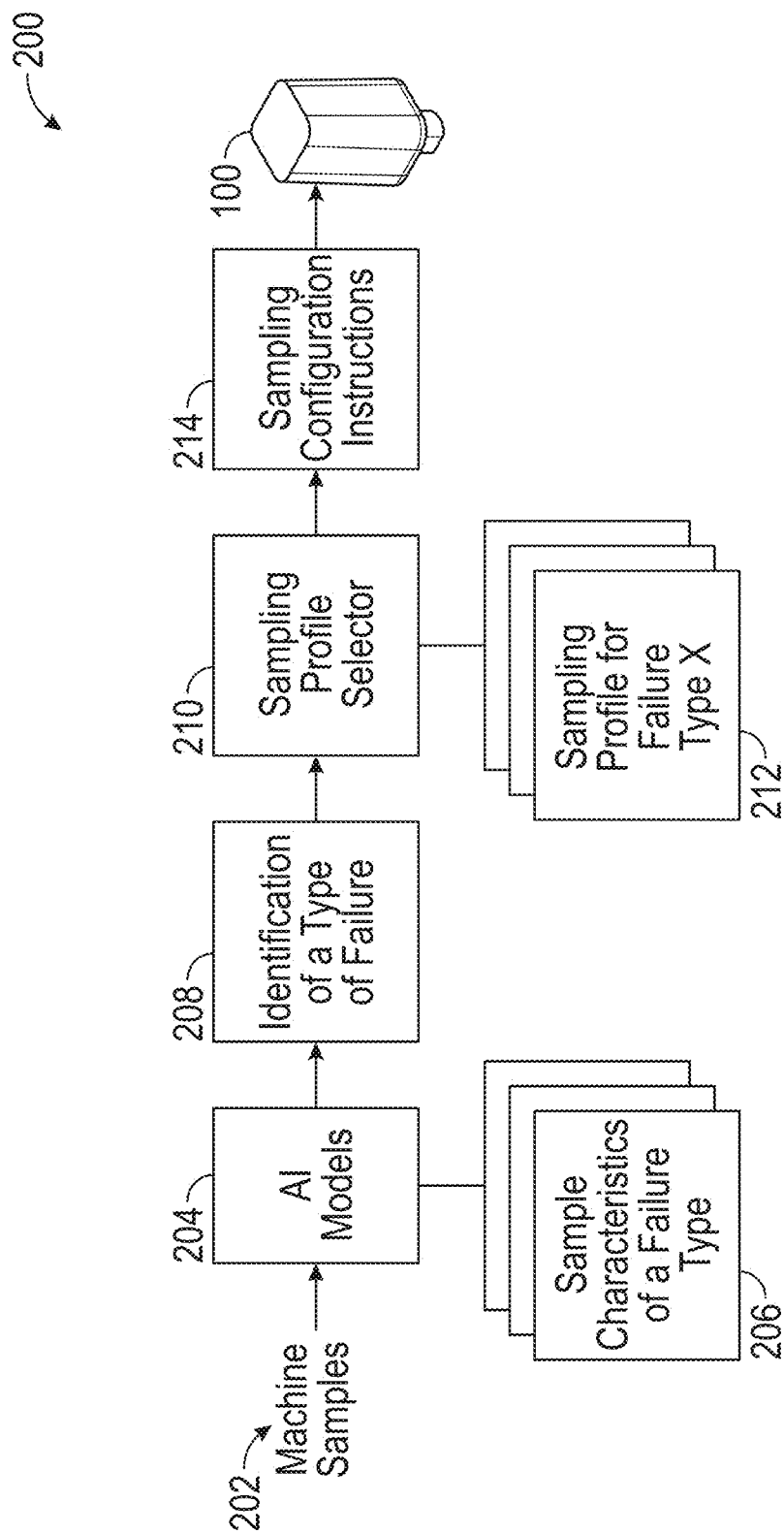
FIG. 2 illustrates a block diagram of example components used for providing dynamic sampling, according to some embodiments.

FIG. 2 illustrates a block diagram 200 of example components used for providing dynamic sampling, according to some embodiments. Machine samples 202 can be used to train AI models 204 in detecting and identifying sample characteristics of various failure types. Machine samples 202 can, for training purposes, be obtained from a variety of sources, including from manual or traditional monitoring devices and/or the monitors 100. Example failures can include cavitation, lubrication deficiency, early or late stage bearing wear, electrical problems, unbalance, misalignment, looseness, beating, pulley problems, gear wear, blades/vanes wear, screw/lobes wear, turbulence, belt wear, abrupt and others. Training the AI models 204 can in part include obtaining healthy samples 202 and samples 202, having a known type of failure and training the AI models to detect patterns or signatures of that type of failure in machine samples 202. Trained AI models 204 can receive machine samples 202, for example from a monitor 100, and can detect whether the sample contains signatures of a failure type. In other words, the trained AI models 204 can detect whether the machine samples 202 contain "sample characteristics of a failure type" 206, and output an "identification of a type of failure" 208. Each failure type can include a corresponding sampling profile 212. A sampling profile selector 210 can receive the identification of a type of failure 208 and can select a corresponding sampling profile 212. The sampling profile selector 210 can send sampling configuration instruction 214 to the monitor 100, which generated the machine samples 202, in order to obtain more robust samples that are more relevant to the detected failure type. After executing the sampling configuration instructions 214, the monitor 100 can revert to a baseline or primary sampling configuration instruction, or to another sampling configuration instruction. In other words, in some scenarios, sampling profile selector 210 can send multiple sampling configuration instructions, for example when multiple failures are detected. In some embodiments, the components and/or outputs 204-214 can be implemented in or can occur within the maintenance suite 107.

In some embodiments, the baseline or primary sampling profile is selected with parameters that allow capturing sample characteristics of a wide range of failure types. For example, the baseline sampling profile can be sampling a wide range of frequencies, for example up to 8 KHz, with relatively low resolution, for example, 0.25 Hz, and for a relatively short duration, for example two seconds. Such baseline sampling profile allows for capturing sample characteristics of a wide range of failure types, while conserving battery and avoiding collection of too many samples to conserve the communication bandwidth to the receiver 103. Nevertheless, whether a baseline sampling profile or a custom or optimized sampling profile (based on a detected failure type) is applied, the number of samples that can be obtained are constrained by battery and communication bandwidth considerations.

Figure 3:
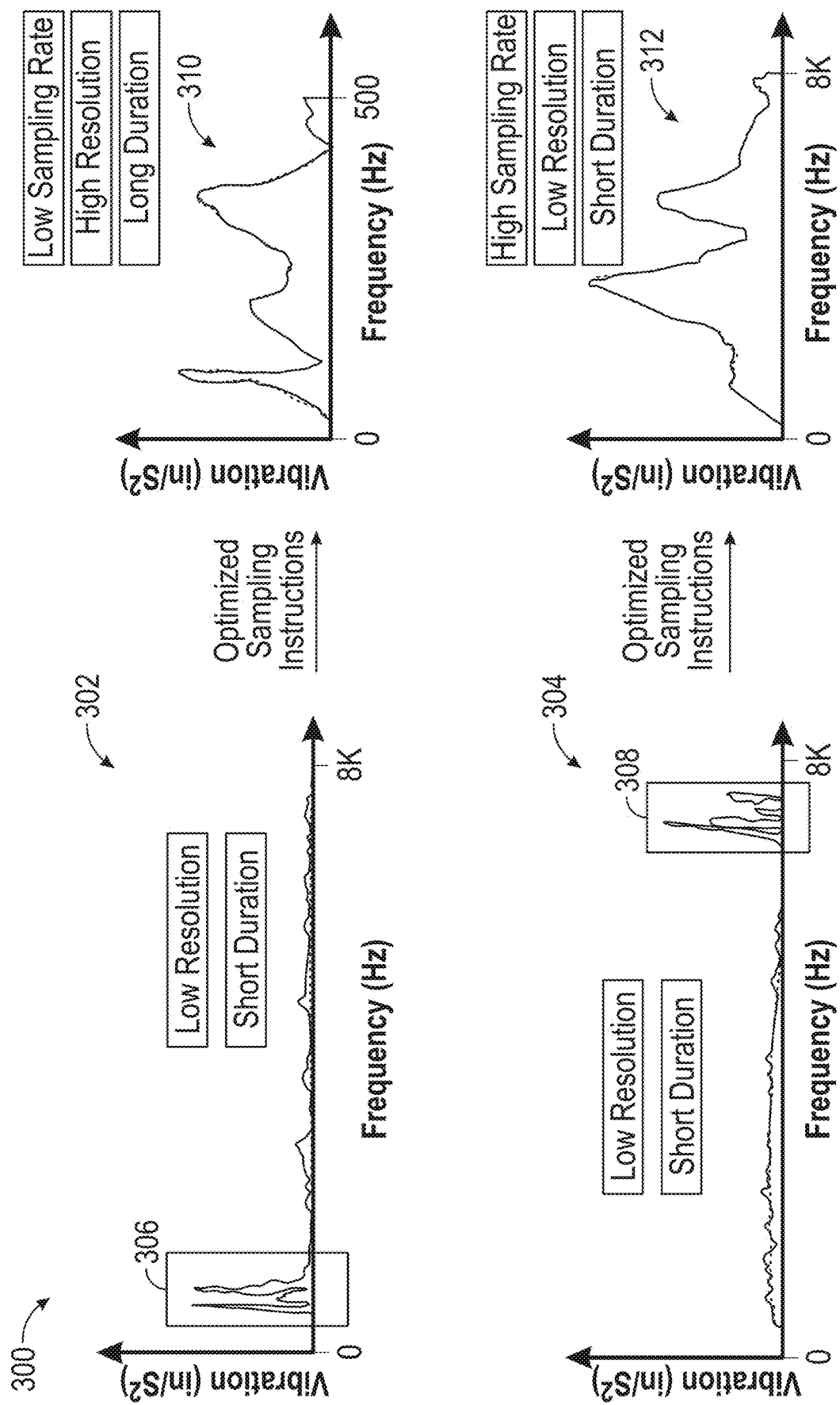
FIG. 3 illustrates graphs of vibration sample data, when a baseline sampling profile is used, and graphs of vibration sample data, when an optimized sampling profile is used.

FIG. 3 illustrates graphs 302, 304 of vibration sample data, when a baseline sampling profile is used, and graphs 310, 312 of vibration sample data, when an optimized or secondary sampling profile is used to collect machine vibration samples. Graph 302 illustrates vibration sample data when a baseline sampling profile is used and a failure type, exhibiting in the lower frequencies segment 306 is presenting. Graph 304 illustrates vibration sample data when a baseline sampling profile is used and a failure type, exhibiting in the high frequencies segment 308 is presenting. To conserve battery and communication bandwidth the baseline sampling profile utilizes a short sampling duration, aiming to capture a large frequency range (for example, from 0 Hz to approximately 8 KHz), and a sampling rate that captures samples throughout the spectrum at a low resolution. An example configuration of the baseline sampling profile is to sample at a sampling rate of approximately 16 KHz, for a sampling duration of two seconds with a relatively low resolution of 0.25 Hz. With this example baseline sampling profile, vibration samples in the frequency range of 0 to 8 KHz will be captured. Graphs 302, 304 show that some failure types are mostly prominently present in a segment of the spectrum. While the baseline sampling profile does capture some samples in the relevant segments, many baseline samples are wasted, as they are not targeting the spectrum segment in which a failure type is presented.

Segment 306 can include the sampling characteristics of a failure type presenting in the low frequency regions of the spectrum. Example failures that can show up in segment 306 or similar regions having low frequencies can include unbalance, misalignment, looseness, beating, pulley problems, and others. Segment 308 can include the sampling characteristics of a failure type presenting in the high frequency regions of the spectrum. Example failures that can show up in segment 308 or similar regions having high frequencies can include cavitation, lubrication deficiency, early or late stage bearing wear, electrical problems, and others. The useful portion of the samples Referring to both FIGS. 2 and 3, when the AI models 204 receive the samples in the graphs 302, or 304, the AI models 204 can detect a failure type, based on signatures of that failure type exhibiting in the samples. The AI models 204 can output an identification of the type of failure exhibiting in the samples. The sampling profile selector 210 can select a corresponding sampling profile for the failure type and can send corresponding sampling configuration instructions to the monitor 100. In the case of graph 302, after the monitor 100 executes the optimized sampling instructions, the available samples are captured at a more relevant segment of the spectrum or segment 306, in this case. The sampling instructions in this scenario include selecting a low sampling rate, for example 1 KHz, and a long duration, for example 32 seconds. In this manner, the frequency range of captured samples can include the range 0 to 500 Hz, and a high resolution 0.03 Hz is achieved. The duration is selected, as the inverse of a target resolution. The target resolution is selected based on the failure type and whether samples close together (high resolution) or further apart (low resolution) are useful for further detecting a failure type more accurately.

In the case of graph 304, after the monitor 100 executes the optimized sampling instructions, the available samples are captured at a more relevant segment of the spectrum or segment 308, in this case. The sampling instructions in this scenario include selecting a high sampling rate, for example 16 KHz, and a short duration, for example two seconds. In this manner, the frequency range of captured samples can include the range 0 to 8 KHz, and a low resolution 0.5 Hz is achieved.

Figure 4:
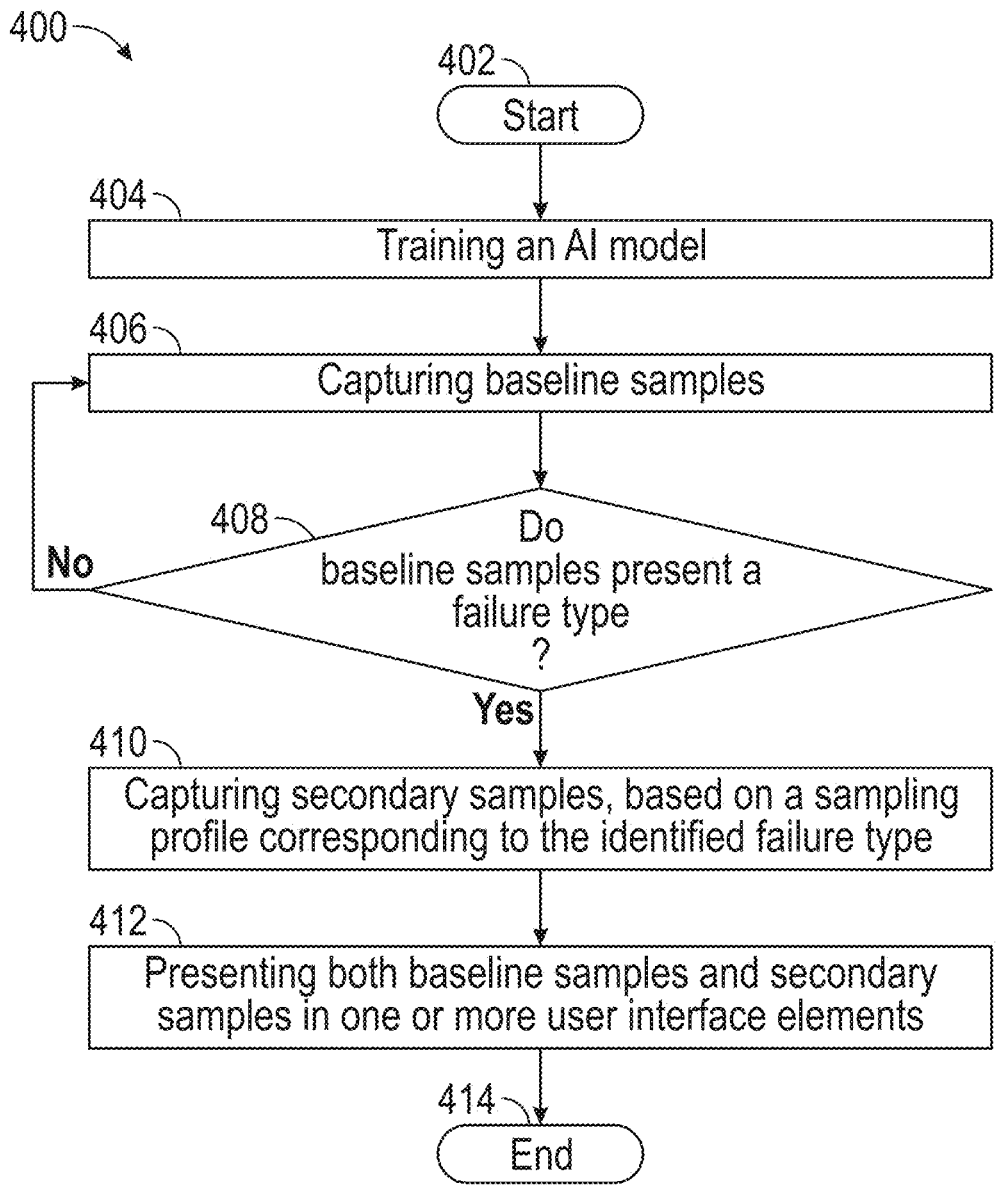
FIG. 4 illustrates a flowchart of a method of dynamic sampling, according to an embodiment.

FIG. 4 illustrates a flowchart of a method 400 of dynamic sampling, according to an embodiment. The method starts at step 402. Step 404 includes training an artificial intelligence (AI) model to receive vibration samples and identify whether the samples contain any signatures of a machine failure type. Training can include iteratively providing the model with healthy samples, as well as samples with known failure types, and instructing the model to adjust its parameters to match the known output. Step 406 includes capturing baseline samples, using a baseline sampling profile. In the context of the operations of the monitor 100, the baseline sampling profile can be selected to capture samples of sufficient quality and quantity for the trained AI model. In some embodiments, the baseline sampling profile covers a large portion of the frequency spectrum of a vibration signal. The vibration signal can be captured with a motion sensor or accelerometer from the machine 102. For example, the baseline sampling profile can include sampling instructions for the monitor 100 to capture samples from a very low frequency to a very high frequency (e.g., from 0 Hz to 8 KHz), thereby covering a large frequency range. The sampling rate can also be selected based on the selected frequency range. For example, in some embodiments, the sampling rate is proportional to the frequency range (e.g., double the frequency range, or 16 KHz in some embodiments). The sampling duration can be selected for a short duration to reduce battery consumption and preserve bandwidth between the monitor 100 and the receiver 103, as fewer samples due to shorter sampling duration are transferred to the receiver 103. In some embodiments, the baseline sampling profile can use a sampling duration of two seconds.

In some embodiments, the accelerometer can capture vibration sample signals along three axes, XYZ. For some machines generating low frequency vibrations, for example less than 10 Hz, vibration signal samples from a single axis, for example the Z axis, can be selected as a representative axis. Samples from the other axes can be disregarded. In other scenarios, samples from all axes are captured, transmitted and analyzed by the maintenance suite 107.

Step 408 includes analyzing the baseline samples with the AI model, trained at step 404, and determining whether the baseline samples present a failure type. Each failure type can include a corresponding sampling profile, selected to target the samples in an area of the frequency spectrum, where the signal characteristics of the failure are likely to occur. The sampling profiles are further selected to conserve the monitor battery and the communication bandwidth between the monitor 100 and the receiver 103. The power and communication constraints can limit the number of samples that can be collected, compared to unrestricted manual or traditional vibration analyzers. Therefore, the sampling profiles are selected to distribute the available samples to be captured to a targeted portion of the frequency spectrum. If at step 408, it is determined that the baseline samples do not present a failure type, the method moves to step 406, where the monitor 100 continues to capture baseline samples according to a schedule. If the baseline samples present a failure type, the method moves to step 410.

In some embodiments, the failure types can be categorized, where each category shares a common sampling profile. For example, some failure types present in the low frequency regions of the frequency spectrum. A sampling profile for the low frequency failure types can distribute the available samples in the low frequency region of the spectrum by selecting a low frequency range (e.g., from approximately between 400 up to 600 Hz) with a low sampling rate (e.g. a sampling rate approximately between 0.8 to 1.2 KHz) for a relatively long sampling period (e.g., approximately between 31 to 33 seconds). The low frequency sampling profile configured with the above example ranges can achieve a resolution of no finer than 0.02 Hz, which can satisfy the battery and communication bandwidth constraints, while targeting the available samples in a region of interest in the spectrum corresponding to the identified failure type. Other failure types may present in the high frequency regions of the frequency spectrum. A sampling profile for the high frequency failure types can distribute the available samples in the high frequency region of the spectrum by selecting a high frequency range (e.g., from approximately between 7.5 up to 8.5 KHz) with a high sampling rate (e.g., a sampling rate approximately between 15 to 17 KHz) for a relatively short sampling period (e.g., approximately between one to three seconds). The high frequency sampling profile configured with the above example ranges can achieve a resolution of no finer than 0.4 Hz, which can satisfy the battery and communication bandwidth constraints, while targeting the available samples in a region of interest in the spectrum corresponding to the identified failure type. Similarly, another category of failure types can present in the midrange frequencies of the spectrum. For the midrange frequencies sampling profile can include instructions to sample midrange frequencies (e.g., up to 4 KHz), with a midrange sampling rate (e.g., 8 KHz), and a moderately long sampling duration (e.g., four seconds). Example failure types that can present in midrange frequencies can include gear wear, bladed/vanes wear, screw/lobes wear, turbulence, belt wear, and abrupt failures. However categorization and shared sampling profile is not necessary in every implementation. In some embodiments, each failure type can have a corresponding unique sampling profile.

Step 410 includes capturing secondary samples, based on a sampling profile corresponding to the identified failure type at step 408. Step 412 can include presenting both baseline samples and secondary samples in one or more user interface elements. The baseline and the secondary samples can be used to take remedial action with respect to a developing machine failure. The method ends at step 414.

EXAMPLES

It will be appreciated that the present disclosure may include any one and up to all of the following examples.

Example 1: A method of monitoring an industrial machine comprising: providing a monitor, comprising a microcontroller, a battery and a motion sensor, the motion sensor, the monitor in wireless communication with a receiver, the monitor configured to capture vibration samples of a machine; the monitor capturing baseline samples, according to a baseline sampling profile; an artificial intelligence model, trained to detect a plurality of machine failure types, receiving the captured baseline samples and identifying a machine failure type presenting in the baseline samples; a sampling profile selector, selecting an optimized sampling profile corresponding to the identified machine failure type; the sampling profile selector, generating sampling configuration instructions, based on the optimized sampling profile corresponding to the identified machine failure type; the sampling profile selector, transmitting the optimized sampling configuration instructions to the monitor; and the monitor executing the optimized sampling configuration instructions, obtaining samples targeted at a spectrum region corresponding to the identified machine failure type.

Example 2: The method of Example 1, wherein the baseline and sampling profiles comprise a selected number of samples, wherein the number of samples are optimized to conserve battery power and a communication bandwidth to the receiver.

Example 3: The method of any of Examples 1 and 2, wherein the optimized sampling profile comprises concentrating a plurality of samples in a region of the frequency spectrum relevant to the identified machine failure type.

Example 4: The method of any of Examples 1-3, wherein the identified machine failure type exhibits in a low frequency region of the spectrum, comprising frequencies from approximately 400 Hz to 600 Hz, and the sampling configuration instructions comprise targeting the sampling to a low frequency region by: selecting a low sampling rate, comprising approximately between 0.8 to 1.2 KHz; and selecting a long sampling duration, comprising approximately between 31 to 33 seconds.

Example 5: The method of any of Examples 1-4, wherein the identified machine failure type exhibits in a high frequency region of the spectrum, comprising frequencies approximately from 7.5 KHz to 8.5 KHz, and the sampling configuration instructions comprise targeting the sampling to a high frequency region by: selecting a high sampling rate, comprising approximately between 15 to 17 KHz; and selecting a short sampling duration, comprising approximately between one to three seconds.

Example 6: The method of any of Examples 1-5, wherein the motion sensor is a triaxial accelerometer, and the method further comprises: selecting a representative axis and transmitting vibration sample data from the representative axis.

Example 7: The method of any of Examples 1-6, wherein the baseline sampling profile comprises a short duration of approximately one to three seconds and a high sampling rate of approximately between 15 to 17 KHz.

Example 8: The method of any of Examples 1-7, wherein the machine failure types comprise a first and second category, the first category comprising machine failures exhibiting sample characteristics in a low frequency region of the spectrum, and the second category comprising machine failure types exhibiting sample characteristics in a high frequency region of the spectrum.

Example 9: The method of any of Examples 1-8, wherein the machine failure types comprise a first and second category, the first category comprising machine failures exhibiting sample characteristics in a low frequency region of the spectrum, and the second category comprising machine failure types exhibiting sample characteristics in a high frequency region of the spectrum, wherein the first category comprises one or more of unbalance, misalignment, looseness, beating, and pulley problems; and the second category comprises one or more of cavitation, lubrication deficiency, early or late stage bearing wear, and electrical problems.

Example 10: The method of any of Examples 1-9, wherein the machine failure types comprise a first and second category, the first category comprising machine failures exhibiting sample characteristics in a low frequency region of the spectrum, and the second category comprising machine failure types exhibiting sample characteristics in a high frequency region of the spectrum, wherein each failure type category comprises a corresponding optimized sampling profile, wherein the optimized sampling profile of the first category comprises a low sampling rate and a longer sampling duration, and the optimized sampling profile of the second category comprises a high sampling rate, and a short sampling duration.

Example 11: A method of monitoring an industrial machine comprising: training an AI model to receive machine vibration samples and identify a failure type, each failure type having a corresponding sampling profile; with a monitor, having a microcontroller, a battery and an accelerometer, capturing baseline vibration samples of a machine, according to a baseline sampling profile; analyzing the baseline vibration samples with the trained AI model; identifying a failure type presenting in the baseline vibration samples; selecting a secondary sampling profile corresponding to the identified failure type; reconfiguring the monitor, based on the secondary sampling profile, capturing secondary vibration samples with the reconfigured monitor; and displaying in one or more user interface elements, the baseline vibration samples and the secondary vibration samples.

Example 12: The method of Example 11, wherein the secondary samples are targeted to a region of a frequency spectrum, presenting signal characteristics of the identified failure type, wherein the frequency spectrum corresponds to a vibration signal, captured by the accelerometer.

Example 13: The method of any of Examples 11 and 12, wherein the vibration samples correspond to a frequency spectrum, and the method further comprises: conserving the battery and conserving a communication bandwidth from the monitor to a receiver by: selecting the baseline sampling profile to sample a large portion of the frequency spectrum at a high sampling rate for a short sampling duration.

Example 14: The method of any of Examples 11-13, wherein the large portion of the frequency spectrum comprises frequencies approximately between 7.5 to 8.5 KHz, the sampling rate comprises approximately between 15 to 17 KHz, and the sampling duration comprises approximately between one to three seconds.

Example 15: The method of any of Examples 11-14, wherein the vibration samples correspond to a frequency spectrum, and the method further comprises: conserving the battery and conserving a communication bandwidth from the monitor to a receiver, while capturing samples relevant to the identified failure type by: selecting the secondary sampling profile to sample a low frequency portion of the frequency spectrum at a low sampling rate for a long sampling duration.

Example 16: The method of any of Examples 11-15, wherein the low frequency portion of the frequency spectrum comprises frequencies approximately between 400 to 600 Hz, the sampling rate comprises approximately between 0.8 to 1.2 KHz, and the sampling duration comprises approximately between 31 to 32 seconds.

Example 17: A system comprising one or more processors, wherein the one or more processors are configured to perform operations comprising: training an AI model to receive machine vibration samples and identify a failure type, each failure type having a corresponding sampling profile; with a monitor, having a microcontroller, a battery and an accelerometer, capturing baseline vibration samples of a machine, according to a baseline sampling profile; analyzing the baseline vibration samples with the trained AI model; identifying a failure type presenting in the baseline vibration samples; selecting a secondary sampling profile corresponding to the identified failure type; reconfiguring the monitor, based on the secondary sampling profile, capturing secondary vibration samples with the reconfigured monitor; and displaying in one or more user interface elements, the baseline vibration samples and the secondary vibration samples.

Example 18: The system of Example 17, wherein the secondary samples are targeted to a region of a frequency spectrum, presenting signal characteristics of the identified failure type, wherein the frequency spectrum corresponds to a vibration signal, captured by the accelerometer.

Example 19: The system of any of Examples 17 and 18, wherein the vibration samples correspond to a frequency spectrum, and the operations further comprise: conserving the battery and conserving a communication bandwidth from the monitor to a receiver by: selecting the baseline sampling profile to sample a large portion of the frequency spectrum at a high sampling rate for a short sampling duration.

Example 20: The system of any of Examples 17-19, wherein the vibration samples correspond to a frequency spectrum, and the operations further comprise: conserving the battery and conserving a communication bandwidth from the monitor to a receiver, while capturing samples relevant to the identified failure type by: selecting the secondary sampling profile to sample a low frequency portion of the frequency spectrum at a low sampling rate for a long sampling duration.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method of monitoring an industrial machine comprising:
    a monitor, comprising a microcontroller, a battery and a motion sensor, the monitor wirelessly communicating with a receiver, the monitor, via the receiver, wirelessly communicating with a maintenance and monitoring infrastructure;
    the monitor, capturing vibration samples of a machine with the motion sensor;
    the maintenance and monitoring infrastructure, instructing the monitor with a baseline sampling profile;
    the monitor capturing baseline samples, according to the baseline sampling profile instructions received from the maintenance and monitoring infrastructure;
    the monitor, transmitting the captured baseline samples to the maintenance and monitoring infrastructure;
    the maintenance and monitoring infrastructure, comprising an artificial intelligence model, the artificial intelligence model, trained to detect a plurality of machine failure types, the artificial intelligence model receiving the captured baseline samples and identifying a machine failure type presenting in the baseline samples;
    the maintenance and monitoring infrastructure comprising a sampling profile selector, the sampling profile selector, selecting an optimized sampling profile corresponding to the identified machine failure type;
    the sampling profile selector, generating sampling configuration instructions, based on the optimized sampling profile corresponding to the identified machine failure type;
    the sampling profile selector, transmitting the optimized sampling configuration instructions to the monitor;
    the monitor executing the optimized sampling configuration instructions;
    the monitor, obtaining samples targeted at a spectrum region corresponding to the identified machine failure type; and
    triggering repairing a failure in the machine, based at least in part on the obtained samples targeted at the spectrum region corresponding to the identified machine failure type.

2. The method of claim 1, wherein the baseline and sampling profiles comprise a selected number of samples, wherein the number of samples are optimized to conserve battery power and a communication bandwidth to the receiver.

3. The method of claim 1, wherein the optimized sampling profile comprises concentrating a plurality of samples in a region of the frequency spectrum relevant to the identified machine failure type.

4. The method of claim 1, wherein the identified machine failure type exhibits in a low frequency region of the spectrum, comprising frequencies from approximately 400 Hz to 600 Hz, and the sampling configuration instructions comprise targeting the sampling to a low frequency region by:
    selecting a low sampling rate, comprising approximately between 0.8 to 1.2 KHz; and
    selecting a long sampling duration, comprising approximately between 31 to 33 seconds.

5. The method of claim 1, wherein the identified machine failure type exhibits in a high frequency region of the spectrum, comprising frequencies approximately from 7.5 KHz to 8.5 KHz, and the sampling configuration instructions comprise targeting the sampling to a high frequency region by:
    selecting a high sampling rate, comprising approximately between 15 to 17 KHz; and
    selecting a short sampling duration, comprising approximately between one to three seconds.

6. The method of claim 1, wherein the motion sensor is a triaxial accelerometer, and the method further comprises:
    selecting a representative axis and transmitting vibration sample data from the representative axis.

7. The method of claim 1, wherein the baseline sampling profile comprises a short duration of approximately one to three seconds and a high sampling rate of approximately between 15 to 17 KHz.

8. The method of claim 1, wherein the machine failure types comprise a first and second category, the first category comprising machine failures exhibiting sample characteristics in a low frequency region of the spectrum, and the second category comprising machine failure types exhibiting sample characteristics in a high frequency region of the spectrum.

9. The method of claim 1, wherein the machine failure types comprise a first and second category, the first category comprising machine failures exhibiting sample characteristics in a low frequency region of the spectrum, and the second category comprising machine failure types exhibiting sample characteristics in a high frequency region of the spectrum, wherein
    the first category comprises one or more of unbalance, misalignment, looseness, beating, and pulley problems; and
    the second category comprises one or more of cavitation, lubrication deficiency, early or late stage bearing wear, and electrical problems.

10. The method of claim 1, wherein the machine failure types comprise a first and second category, the first category comprising machine failures exhibiting sample characteristics in a low frequency region of the spectrum, and the second category comprising machine failure types exhibiting sample characteristics in a high frequency region of the spectrum, wherein each failure type category comprises a corresponding optimized sampling profile, wherein the optimized sampling profile of the first category comprises a low sampling rate and a longer sampling duration, and the optimized sampling profile of the second category comprises a high sampling rate, and a short sampling duration.

11. A method of monitoring an industrial machine comprising:
in a maintenance infrastructure, comprising an AI model, training the AI model to receive machine vibration samples and identify a failure type, each failure type having a corresponding sampling profile;
wherein the monitor, comprises a microcontroller, a battery, and an accelerometer;
the monitor wirelessly communicating with the maintenance infrastructure via a wireless receiver;
the maintenance infrastructure instructing the monitor with a baseline sampling profile;
the monitor, capturing baseline vibration samples of a machine, according to the baseline sampling profile;
the monitor, wirelessly transmitting the vibration samples to the maintenance infrastructure, via the wireless receiver;
the maintenance infrastructure, analyzing the baseline vibration samples with the trained AI model;
identifying a failure type presenting in the baseline vibration samples;
selecting a secondary sampling profile corresponding to the identified failure type;
the maintenance infrastructure, wirelessly transmitting the secondary sampling profile to the monitor, via the wireless receiver;
reconfiguring the monitor, based on the secondary sampling profile;
the monitor, capturing secondary vibration samples, based on the secondary sampling profile;
displaying in one or more user interface elements, the baseline vibration samples and the secondary vibration samples; and
triggering repairing a failure in the machine, based at least in part on one or more of the baseline and secondary vibration samples.

12. The method of claim 11, wherein the secondary samples are targeted to a region of a frequency spectrum, presenting signal characteristics of the identified failure type, wherein the frequency spectrum corresponds to a vibration signal, captured by the accelerometer.

13. The method of claim 11, wherein the vibration samples correspond to a frequency spectrum, and the method further comprises: conserving the battery and conserving a communication bandwidth from the monitor to a receiver by:
selecting the baseline sampling profile to sample a large portion of the frequency spectrum at a high sampling rate for a short sampling duration.

14. The method of claim 13, wherein the large portion of the frequency spectrum comprises frequencies approximately between 7.5 to 8.5 KHz, the sampling rate comprises approximately between 15 to 17 KHz, and the sampling duration comprises approximately between one to three seconds.

15. The method of claim 11, wherein the vibration samples correspond to a frequency spectrum, and the method further comprises: conserving the battery and conserving a communication bandwidth from the monitor to a receiver, while capturing samples relevant to the identified failure type by:
selecting the secondary sampling profile to sample a low frequency portion of the frequency spectrum at a low sampling rate for a long sampling duration.

16. The method of claim 15, wherein the low frequency portion of the frequency spectrum comprises frequencies approximately between 400 to 600 Hz, the sampling rate comprises approximately between 0.8 to 1.2 KHz, and the sampling duration comprises approximately between 31 to 32 seconds.

17. A non-transitory computer-readable medium, which stores program instructions for performing operations comprising:
in a maintenance infrastructure, comprising an AI model, training the AI model to receive machine vibration samples and identify a failure type, each failure type having a corresponding sampling profile;
wherein the monitor, comprises a microcontroller, a battery, and an accelerometer;
the monitor wirelessly communicating with the maintenance infrastructure via a wireless receiver;
the maintenance infrastructure instructing the monitor with a baseline sampling profile;
the monitor, capturing baseline vibration samples of a machine, according to the baseline sampling profile;
the monitor, wirelessly transmitting the vibration samples to the maintenance infrastructure, via the wireless receiver;
the maintenance infrastructure, analyzing the baseline vibration samples with the trained AI model;
identifying a failure type presenting in the baseline vibration samples;
selecting a secondary sampling profile corresponding to the identified failure type;
the maintenance infrastructure, wirelessly transmitting the secondary sampling profile to the monitor, via the wireless receiver;
reconfiguring the monitor, based on the secondary sampling profile
the monitor, capturing secondary vibration samples, based on the secondary sampling profile with the reconfigured monitor;
displaying in one or more user interface elements, the baseline vibration samples and the secondary vibration samples; and
triggering repairing a failure in the machine, based at least in part on one or more of the baseline and secondary vibration samples.

18. The non-transitory computer-readable medium of claim 17, wherein the secondary samples are targeted to a region of a frequency spectrum, presenting signal characteristics of the identified failure type, wherein the frequency spectrum corresponds to a vibration signal, captured by the accelerometer.

19. The non-transitory computer-readable medium of claim 17, wherein the vibration samples correspond to a frequency spectrum, and the operations further comprise: conserving the battery and conserving a communication bandwidth from the monitor to a receiver by:
selecting the baseline sampling profile to sample a large portion of the frequency spectrum at a high sampling rate for a short sampling duration.

20. The non-transitory computer-readable medium of claim 17, wherein the vibration samples correspond to a frequency spectrum, and the operations further comprise: conserving the battery and conserving a communication bandwidth from the monitor to a receiver, while capturing samples relevant to the identified failure type by:

selecting the secondary sampling profile to sample a low frequency portion of the frequency spectrum at a low sampling rate for a long sampling duration.

* * * * *